(12) United States Patent
Sarlet et al.

(10) Patent No.: US 8,559,817 B2
(45) Date of Patent: Oct. 15, 2013

(54) COMMUNICATION SYSTEM COMPRISING A TUNABLE LASER

(75) Inventors: Gert Sarlet, Sundbyberg (SE); Pierre-Jean Rigole, Bromma (SE)

(73) Assignee: Syntune AB, Kista (SE)

( * ) Notice: Subject to any disclaimer, the term of this patent is extended or adjusted under 35 U.S.C. 154(b) by 134 days.

(21) Appl. No.: 13/126,087

(22) PCT Filed: Oct. 13, 2009

(86) PCT No.: PCT/SE2009/051166
§ 371 (c)(1),
(2), (4) Date: Jul. 8, 2011

(87) PCT Pub. No.: WO2010/050878
PCT Pub. Date: May 6, 2010

(65) Prior Publication Data
US 2011/0274439 A1    Nov. 10, 2011

(30) Foreign Application Priority Data
Oct. 28, 2008   (SE) ....................................... 0850057

(51) Int. Cl.
*H04J 14/02*   (2006.01)
(52) U.S. Cl.
USPC ................................. 398/69; 398/72; 398/196
(58) Field of Classification Search
USPC ....................................... 398/135, 197, 69–72
See application file for complete search history.

(56) References Cited

U.S. PATENT DOCUMENTS

| | | | |
|---|---|---|---|
| 5,717,510 A | 2/1998 | Ishikawa et al. | |
| 6,141,126 A | 10/2000 | Lahat et al. | |
| 2003/0179988 A1 | 9/2003 | Kai et al. | |
| 2007/0019956 A1* | 1/2007 | Sorin et al. | 398/71 |
| 2008/0085118 A1* | 4/2008 | Effenberger | 398/82 |
| 2008/0089699 A1* | 4/2008 | Li et al. | 398/197 |

FOREIGN PATENT DOCUMENTS

WO    01/03337 A1    1/2001

OTHER PUBLICATIONS

International Search Report, dated Mar. 5, 2010, from corresponding PCT application.

* cited by examiner

*Primary Examiner* — Leslie Pascal
(74) *Attorney, Agent, or Firm* — Young & Thompson

(57) ABSTRACT

A communication system includes a communication unit with a first part and a number of a second part, where the second part is arranged to be placed at the location of an end user, and where the first part is common for a number of second parts. The first part and the second part respectively include a laser, and each second part is connected with the first part by a fiber optic cable and a frequency filter, the first part and the relevant second part being arranged to exchange information by laser light. Each second part includes a tunable laser, the first part is arranged to analyze light received from a second part, and to transmit information to the second part while the first part is receiving light from the second part, and the information contains information for the second part that it should adjust, where required, its frequency or wavelength, and the second part thus is arranged to change its frequency or wavelength.

13 Claims, 3 Drawing Sheets

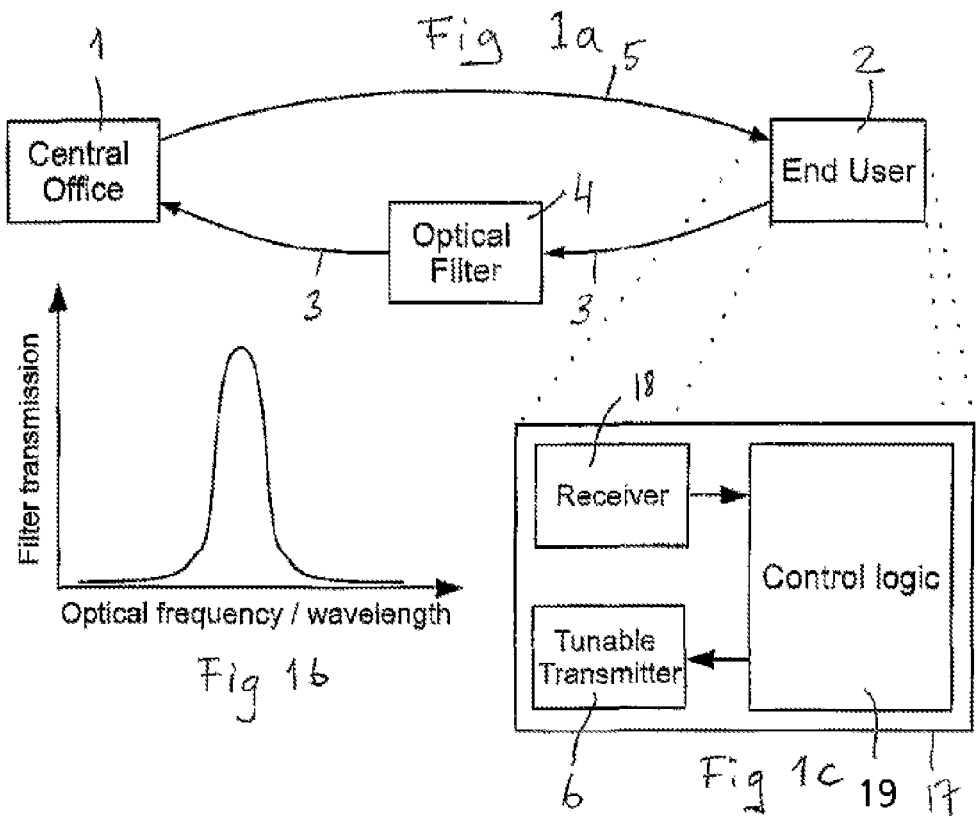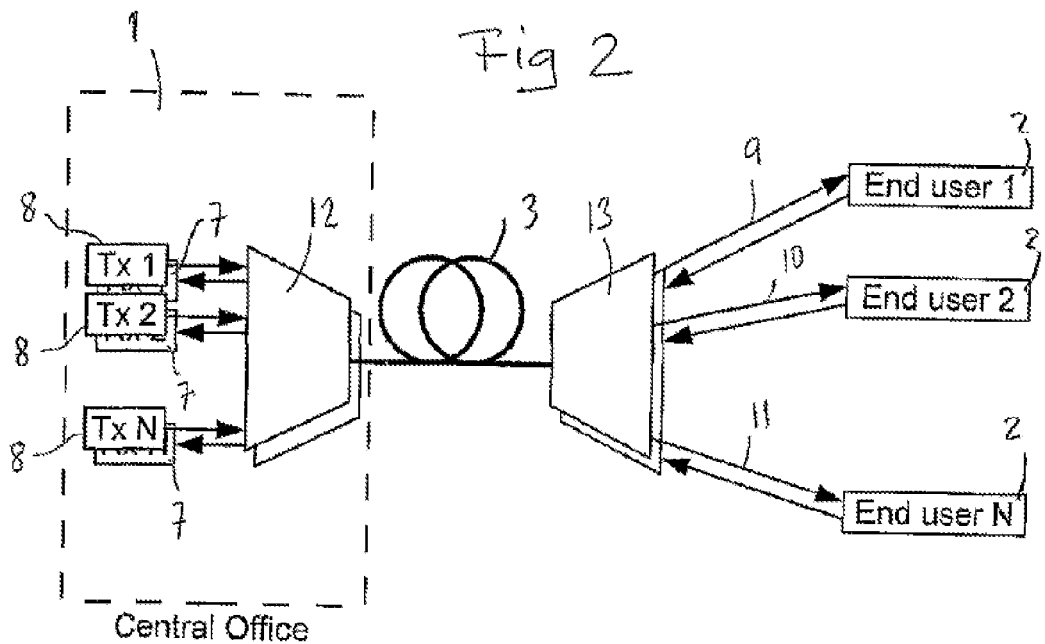

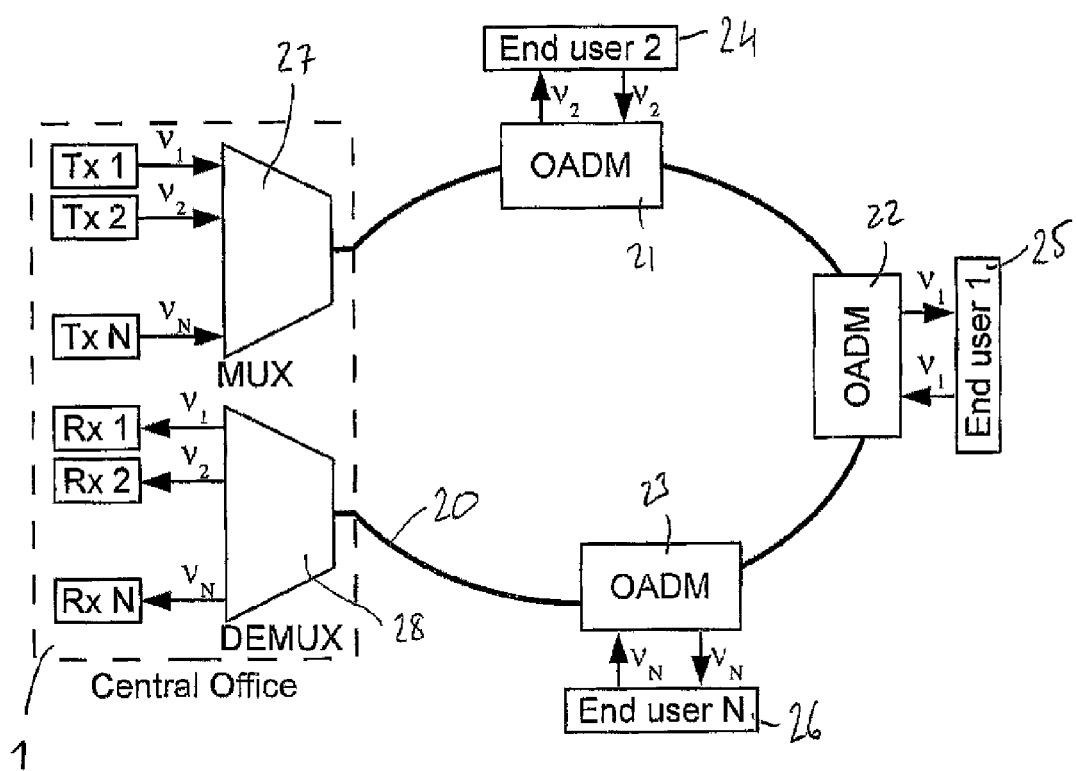

COMMUNICATION SYSTEM COMPRISING A TUNABLE LASER

Figure 3A:
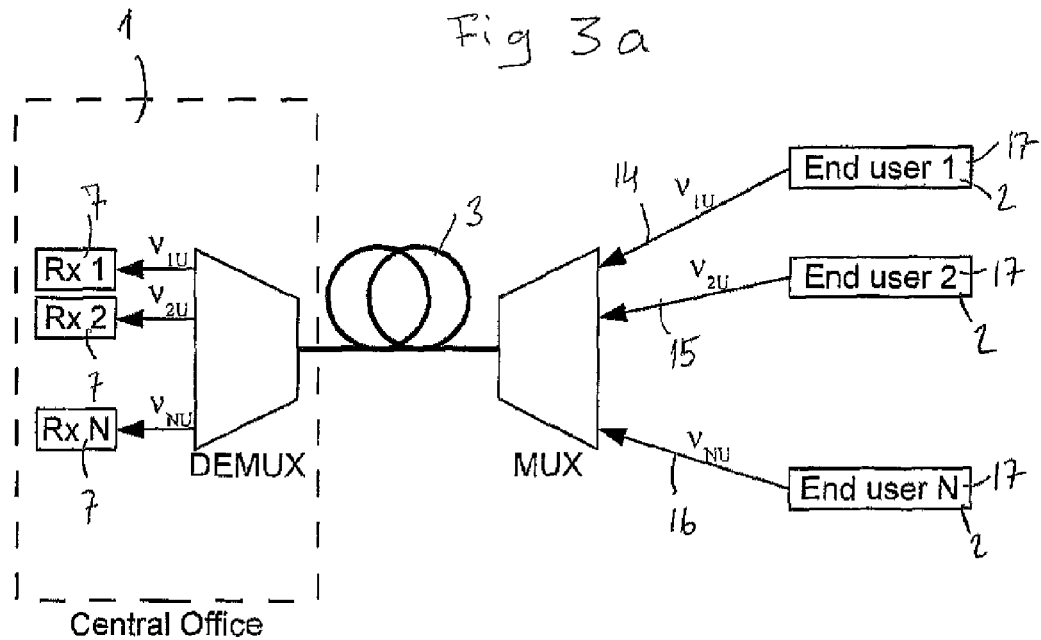

The present invention relates to a communication system comprising a tunable laser, and in particular to a communication unit, where one part is intended to be located at an end-user location (a domicile, an office, a block of flats) and where one part is common for a number of the said parts located at the end users.

In order to achieve that end-user locations, such as domiciles and offices, etc., are provided with the possibility of communication through fibre optic cable, it is required that a communication laser be located at each end-user location that is connected, where it is required that the cable is connected at its second end to a communication laser, which is provided with information from a source of information. It must be possible to tune such lasers in order for it to be possible to select the channel, i.e. the frequency or wavelength, for the communication.

A number of tunable lasers are available. One type of laser is that known as an ECL-laser (External Cavity Laser). This comprises an amplifier chip, connective optical components and one or several external optical filters. The mutual alignment of the components must be of very high precision in such lasers, and this means that the manufacturing costs and the material costs are both high. An ECL laser, however, gives a very high spectral purity.

A second type of laser is that known as a DFB-laser (Distributed Feedback), where an array of DFB lasers is used. Each DFB laser can be tuned by means of the temperature of the laser. The light emitted from each one of the DFB lasers is directed into the same optical fibre by means of an MEMS mirror (Micro-Electromechanical Mirror), or through the use of a passive N:1 combiner, where N is the number of lasers in the array. The use of an MEMS mirror leads to the laser being sensitive to vibrations.

On the other hand, the use of an N:1 combiner leads to damping by at least a factor of 1/N, which leads to the requirement that the signal, the light, be amplified. Furthermore, the thermal tuning is slow.

A further type of laser is a DBR laser (Distributed Bragg Reflector). An SGDBR laser (Sampled Grating Distributed Bragg Reflector), and a digital super-mode (DS) DBR laser, and an MG-Y laser are all monolithic arrangements, i.e. the complete tunable laser consists of a single chip of InP with waveguides of InGaAsP. Such lasers are manufactured on a single wafer, and this means that the manufacture is cost-effective. An MG-Y laser is described in the Swedish patent number 529492. Since these lasers are tuned by means of current injection into one or several sections, the tuning is very rapid. These lasers are also the smallest tunable lasers.

Present applications for city-wide and long-distance networks require that the frequencies or wavelengths of the lasers be controlled with high precision without the traffic being interrupted, and this control must be exerted for long periods. This requires, in turn, that the temperatures of the lasers be precisely controlled, and that some form of frequency references be available. The common method of controlling the temperature of a laser is to use a Peltier cooler. This is, however, expensive and sensitive to moisture, which means that the complete arrangement must be enclosed within a hermetically sealed unit. All lasers require also an optical insulator in order to suppress reflections, which may affect the frequency stability.

As a result of the requirements described above, the costs of manufacturing lasers and inspecting them are too high for it to be possible to install one laser at each end-user location in, for example, a large number of domiciles in a housing estate.

The present invention solves this problem by using an approach that differs from that which is prevalent in laser communication systems.

The present invention thus relates to a communication system that comprises a communication unit with a first part and a number of a second part, where the second part is arranged to be located at an end-user location, such as a domicile, office room or equivalent, and where the first part is common for a number of the said second parts, where the first part and each second part comprise a laser, where each second part is connected to the first part by means of a fibre optic cable and a frequency filter, and where the first part and the relevant second part are arranged to exchange information by means of laser light, and is characterised in that each one of the second parts comprises a tunable laser, in that the first part is arranged to analyse light received from a second part, and in that the first part is arranged to transmit information to the second part while the first part is receiving light from the second part, and in that the said information contains information for the second part that it should adjust, where required, its frequency or wavelength, and in that the second part is thereby arranged to change its frequency or wavelength.

Figure 3B:
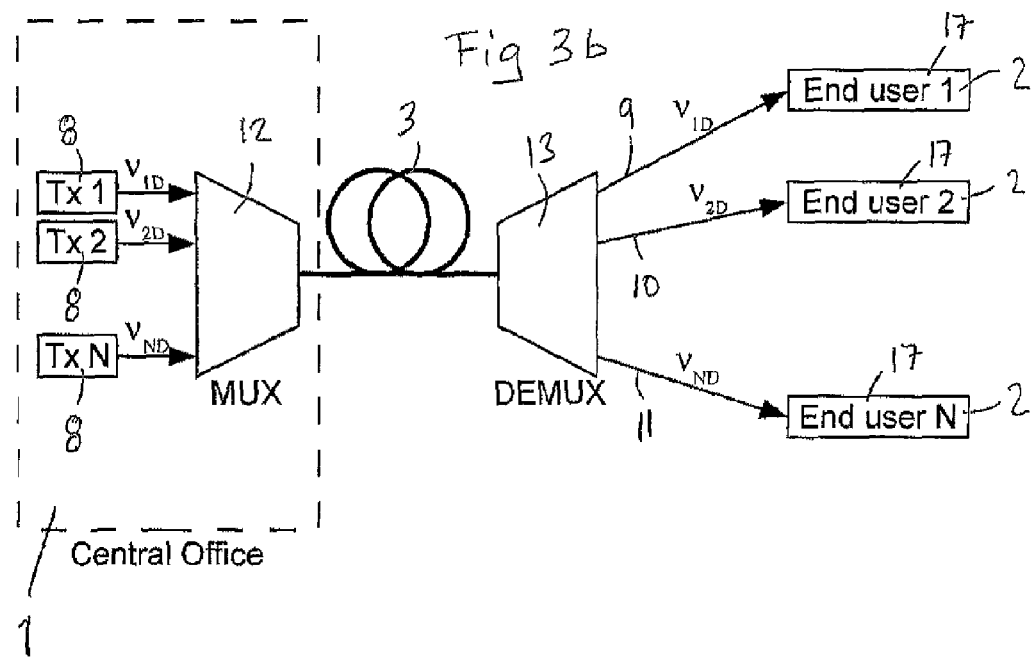

The invention is described in more detail below, partly in association with the attached drawings, where:

FIG. 1a schematically illustrates the present communication system,

FIG. 1b shows the principle of transmission through an optical filter as a function of the optical frequency or wavelength, FIG. 1c shows a block diagram of a second part in one design, FIG. 2 illustrates an embodiment of the invention, FIG. 3a illustrates data traffic from one end user to a base station in the example shown in FIG. 2, FIG. 3b illustrates data traffic from a base station to an end user in the example shown in FIG. 2, and FIG. 4 illustrates an alternative design from the one shown in FIG. 2.

FIG. 1 shows a communication system that comprises a communication unit with a first part 1 (Central Office) and a number of a second part 2 (End User), where the second part 2 is arranged to be located at the location of an end user, such as a domicile, office or equivalent. The present invention can be used in all situations in which a central unit is connected to a number of end users. Only a single second part 2 is shown in FIG. 1. The first part 1 is common for a number of the said second parts 2, where the first part 1 and the second part 2 both comprise a laser.

Each second part 2 is connected to a first part 1 by means of a fibre optic cable 3 and a frequency filter 4 (Optical Filter), and where the first part and the relevant second part are arranged to exchange information by means of laser light. Also the first part in FIG. 1a can transmit light to the second part 2 through the fibre optic cable 5.

It is only necessary for the frequency filter 4 to be located in the connection from the second part 2 to the first part 1. There may be a filter also in the connection from the first part 1 to the second part 2, but this is not an absolute to requirement. If a filter is present in the connection from the first part 1 to the second part 2, it need not be the same filter as that in the connection from the second part 2 to the first part 1.

In the example shown in FIG. 2, the communication from the second part 2 to the first part 1 will take place in another frequency band than the communication from the first part 1 to the second part 2.

Each one of the second parts 2 comprises, according to the invention, a tunable laser 6 (Tunable Transmitter).

The first part 1 is arranged to analyse light received from the second part 2 by means of a receiver 7 (Rx), as shown in FIGS. 2 and 3a. The first part 1 is arranged to transmit information to the second part 2 by means of a transmitter 8 (Tx) in the form of a laser, while the first part 1 is receiving light from the second part 2. The arrow 5 illustrates that information is transmitted from the first part 1 to the second part 2.

Furthermore, the said information to the second part 2 contains, according to the invention, instructions to adjust the frequency or wavelength when this is necessary, and that the second part 2 is thereby arranged to change its frequency or wavelength.

A transmitter (Tx) in the form of a laser is located in a base station (Central Office), and this transmitter transmits a light signal downstream in a fibre 3. The signal is distributed into different fibres 9, 10, 11, at a point that lies close to a group of end users 2 (End User), as shown in FIG. 3b. Each one of the said fibres runs to a single end user. The said fibres 3 may be long, 10-20 km for example, while the final fibres 9, 10, 11 to the end users are only, for example, 100 m long. The lengths are determined, naturally, by geographical conditions.

A higher capacity is obtained by the use of wavelength multiplexing. For this purpose, the transmitter in the base station comprises an array of lasers that transmit signals of different frequencies or wavelengths. The different signals are inserted into the fibre 3 with the aid of a wavelength multiplexer 12 (MUX). The signals are divided up at the end of the fibre 3 into the individual wavelengths by means of a wavelength demultiplexer 13 (DEMUX), as shown in FIG. 3b. This is an example of what is known as a WDM-PON system (Wavelength Division Muliplexing Passive Optical Network).

One advantage of using the WDM-PON technology is that it is relatively simple to upgrade existing PON systems, since it is necessary to exchange only the components at the end points (part 1 and parts 2) and the point of division at which the light is divided up into different wavelengths.

Signals from the base station to the end users have been described above. It is, however, the case that signal traffic takes place also from the end users to the base station. For such signals 14, 15, 16, as shown in FIG. 3a, the said DEMUX 13 will take on the properties of a MUX and the said MUX 12 will take on the properties of a DEMUX. It is thus of the highest importance that the light that is transmitted from any specific end user has the correct wavelength, in order for the light be inserted into the said fibre 3 by the MUX.

The symbols "V" with different subscripts in FIGS. 3a and 3b denote the different optical frequencies or wavelengths.

It is a desire that it be possible to use a universal transceiver (a transmitter and receiver unit) 17 at the end users. This requires that the transceiver 17 comprises a tunable laser 6.

The present invention makes it possible to have a universal transceiver (a transmitter and receiver unit).

It is generally known that the frequency or wavelength of a laser drifts with time. It is therefore necessary that the control currents, voltages and/or temperature of the laser, and thus also its frequency or wavelength, change with time in order for it to be possible for the communication described above to take place. Various arrangements are previously known by which a communication laser can compensate for drift of frequency or wavelength such that the laser maintains its frequency or wavelength, but such arrangements are expensive.

The present invention is based on the concept of allowing the laser of the end user to drift, but providing it with information that enables it to adjust (usually in an iterative manner) its frequency or wavelength, such that it becomes the frequency or wavelength on which it is to transmit in order to be able to communicate with the base station. The laser of the end user obtains this information from the laser of the base station.

According to one preferred embodiment, the laser of the second part is thus not provided with an arrangement comprising a frequency reference, nor with internal arrangements in order to maintain a pre-determined frequency or wavelength.

When a transceiver (a transmitter and receiver unit) with a laser has been installed at the location of an end user, the laser is arranged to transmit on different frequencies successively. The transceiver (a transmitter and receiver unit) 17 of the second part 2 comprises not only a tunable laser 6, but also a receiver 18 (Rx) and a control circuit 19 (Control Logic), as shown in FIG. 1c. The frequencies that the laser 6 transmits are controlled by the control circuit 19. The base station 1 receives the transmitted laser light, provided it has passed the optical filter 4; 12, 13. It has been arranged that the laser 6 will change between different frequencies, and this means that at a certain condition light will be received in the receiver of the base station, and there analysed.

According to one preferred embodiment, the first part 1 is arranged to analyse directly or indirectly light that has been received from a second part 2 with respect to its frequency or wavelength.

According to one preferred embodiment, the first part 1, the base station, is arranged to measure the frequency or wavelength indirectly by measuring the intensity of the light. FIG. 1b shows a curve of the light power received as a function of the frequency or wavelength. In case the first part 1 does not receive the power expected, the first part is arranged to transmit to the second part 2 the said information requesting that it change the frequency or wavelength. The control circuit 19 is arranged to decode this information and then to change the control currents, voltages and/or temperature of the laser 6 such that the frequency or wavelength is changed.

According to one preferred alternative embodiment, the first part 1 is arranged to measure the frequency or wavelength directly.

According to one preferred embodiment, in the case in which the frequency or wavelength deviates from a pre-determined value, the first part 1 is arranged to transmit information to the second part 2 requesting that it change the frequency or wavelength, whereby the control circuit 19 of the second part 2 is arranged to change the frequency or wavelength, after which the first part 1 once again analyses the frequency or wavelength, and is arranged to transmit, if necessary, further information to the second part 2 requesting that it change the frequency or wavelength further.

According to one preferred alternative embodiment of the invention, the second part is arranged to frequency modulate the light that is transmitted, and the first part is arranged to measure the derivative and to determine the sign of the derivative of the power received as a function of the frequency or wavelength of the light received. If the wavelength received from the second part lies on a flank of the filter characteristic during its transmission through a MUX/DEMUX, the frequency modulation will be converted into an amplitude modulation. Only if the wavelength lies at the top of the filter characteristic will the amplitude modulation be equal to zero. The first part is arranged to measure the amplitude, and to send information to the second part with a request for changes in the frequency or wavelength, based on the result of the measurement.

It may occur that a laser in a second part 2 is not capable of being directed to use another frequency or wavelength since it is not possible to increase the control currents, for example, any further. In this case, the laser of the first part is arranged to transmit information to the control circuit 19 of the second part containing a request to reset or restart the laser of the second part. Alternatively, the second part may be arranged to select another working configuration, after receiving information from the first part. This configuration may comprise, for example, another combination of control currents that gives the same frequency or wavelength.

A further possible implementation of the invention is shown in FIG. 4 in which, in contrast to the embodiments described above, a fibre ring 20 with optical add/drop multiplexers 21, 22, 23 (OADM) is used to connect end users 24, 25, 26. An OADM extracts one or several frequencies from an input optical fibre and transmits other frequencies onwards in an output fibre. An OADM may also add new signals to an output fibre, where the signals have the same frequencies as those that have been extracted from the input fibre. A MUX 27 and a DEMUX 28 are located in the base station.

The present invention solves the problems described in the introduction and it allows the use of a cheap tunable laser at the locations of end users, by allowing this laser to drift in frequency or wavelength since control is exerted by the base station when it receives light from a certain end user.

A number of embodiments have been described above. It is, however, obvious that these can be varied with respect to the optical components that are included, in order to achieve the result that a laser at an end-user location is controlled with respect to its frequency or wavelength by a laser located at a base station.

Thus, the present invention is not to be considered to be limited to the embodiments specified above since it can be varied within the scope specified by the attached patent claims.

The invention claimed is:

1. A communication system that comprises:
a communication unit with a first part (1) and a number of a second part (2),
where each second part (2) is arranged to be located at an end-user location,
where the first part (1) is common for the number of the said second parts (2),
where the first part and each second part comprise a laser (Tx, 17),
where each second part is connected to the first part by a fiber optic cable (3) and a frequency filter (4; 12, 13), and
where the first part (1) and each second part (2) are arranged to exchange information by laser light,
where each one of the second parts (2) comprises a tunable laser (6),
where the first part (1) is arranged to analyze light received from each second part (2),
where the first part (1) is arranged to transmit information to the second part (2) while the first part is receiving light from the second part,
where the said information contains information for the second part (2) to adjust, where required, a frequency or wavelength of the second part (2), and
where the second part (2) is thereby arranged to change said frequency or wavelength, each of the lasers (6) is not bound to a certain wavelength/frequency, and each of the lasers (6) is arranged to change between different wavelengths/frequencies by control currents led to the laser,
wherein each of said lasers (6) is arranged to transmit on different wavelengths/frequencies, corresponding to different channels, light emitted from the second part (2) and being received by the first part (1) is analyzed by the first part (1), and the first part (1) is arranged to transmit said information, regarding adjustment of the wavelength/frequency received while the first part (1) is receiving the light emitted from the second part (2).

2. The communication system according to claim 1, characterized in that the first part (1) is arranged to analyze either directly or indirectly light received from a second part (2) with respect to its frequency or wavelength.

3. The communication system according to claim 2, characterized in that the first part (1) is arranged to measure the frequency or wavelength indirectly by measuring the intensity of the light.

4. The communication system according to claim 2, characterized in that the first part (1) is arranged to measure the frequency or wavelength directly.

5. The communication system according to claim 2, characterized in that the second part (2) is arranged to frequency modulate the light that is transmitted, and in that the first part (1) is arranged to measure the derivative of the power received as a function of its frequency or wavelength.

6. The communication system according to claim 1, characterized in that the laser (6) of the second part (2) is not provided with an arrangement comprising a frequency reference, nor with internal arrangements for maintaining a pre-determined frequency or wavelength.

7. The communication system according to claim 1, characterized in that the second part (2) comprises a control circuit (18) for controlling the control currents, voltages and/or temperature of the laser (6), and thus its frequency or wavelength, which control circuit (19) is arranged to change the frequency or wavelength of the laser (6) when the second part (2) has received information from the first part (1) with a request to change the frequency or wavelength of the second part.

8. The communication system according to claim 7, characterized in that, in the case in which the frequency or wavelength deviates from a pre-determined value, the first part (1) is arranged to transmit information to the second part (2) requesting that it change the frequency or wavelength, in that the control circuit (18) of the second part (2) is arranged to change the frequency or wavelength, after which the first part (1) once again analyzes the frequency or wavelength, and is arranged to transmit, if necessary, further information to the second part (2) requesting that it change the frequency or wavelength further.

9. The communication system according to claim 1, characterized in that the first part (1) comprises an array of fixed wavelength lasers.

10. The communication system according to claim 1, characterized in that the first part (1) comprises tunable lasers.

11. The communication system according to claim 1, characterized in that a multiplexer (12) and a demultiplexer (13) are present between the first part (1) and the second part (2), which multiplexer and demultiplexer are arranged to lead light from the first part to the relevant second part and vice versa.

12. The communication system according to claim 1, wherein the end-user location is one of the group consisting of a domicile and an office.

13. A communication system, comprising:

a communication unit with a first part (1) common to, and communicating with, plural second parts (2), each said second part (2) located at a different end-user location and comprising a tunable laser (6), each tunable lasers (6) not being bound to a certain wavelength/frequency and each tunable laser (6) changable between different wavelengths/frequencies corresponding to different channels; and a fiber optic cable (3) and a frequency filter (4; 12, 13) that connects the first part to each second part with said second parts, wherein the first part and each second part comprise a laser (Tx, 17) allowing the first part (1) and each second part (2) to exchange information by laser light, wherein while the first part is receiving and analyzing the laser light received from the second part, the first part is transmitting information to the second part (2) for the second part (2) to adjust a frequency or wavelength of the second part so that the second part (2) changes said frequency or wavelength based on said transmitted information, and wherein said first part exchanges the information with each of said plural second parts transmitting on different wavelengths/frequencies corresponding to different channels with i) the information transmitted from each respective second part being received and analyzed by the first part, and ii) the first part (1) transmitting said information regarding adjustment of the wavelength/frequency back to the respective second parts while the first part (1) continues to receive light with the information transmitted from the respective second parts.

\* \* \* \* \*

UNITED STATES PATENT AND TRADEMARK OFFICE
CERTIFICATE OF CORRECTION

PATENT NO.       : 8,559,817 B2
APPLICATION NO.  : 13/126087
DATED            : October 15, 2013
INVENTOR(S)      : Sarlet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 206 days.

Signed and Sealed this
Fifteenth Day of September, 2015

Michelle K. Lee
*Director of the United States Patent and Trademark Office*